(12) United States Patent
Nakamura

(10) Patent No.: US 6,583,649 B2
(45) Date of Patent: Jun. 24, 2003

(54) SIGNAL TRANSMISSION APPARATUS FOR SETTING DELAY AMOUNT BASED ON OPERATIONAL SPEED

(75) Inventor: Takuji Nakamura, Kanagawa (JP)

(73) Assignee: NEC Corporation, Tokyo (JP)

( * ) Notice: Subject to any disclaimer, the term of this patent is extended or adjusted under 35 U.S.C. 154(b) by 101 days.

(21) Appl. No.: 09/759,348

(22) Filed: Jan. 16, 2001

(65) Prior Publication Data

US 2001/0009386 A1 Jul. 26, 2001

(30) Foreign Application Priority Data

Jan. 24, 2000 (JP) ........................................ 2000-014473

(51) Int. Cl.⁷ .............................................. H01L 25/00
(52) U.S. Cl. ...................... 326/101; 326/21; 327/403; 327/261; 327/170; 327/165; 375/285; 375/346
(58) Field of Search ............................ 326/21, 22, 26; 327/165, 170, 172, 175, 261, 403; 375/285

(56) References Cited

U.S. PATENT DOCUMENTS 5,306,967 A * 4/1994 Dow ........................... 326/101
5,572,549 A * 11/1996 Shimomura et al. ......... 375/285
5,994,946 A * 11/1999 Zhang ......................... 327/403

FOREIGN PATENT DOCUMENTS

| JP | H3-191409 | | 8/1991 | |
| JP | H5-218848 | | 8/1993 | |
| JP | 09023148 A | * | 1/1997 | ....... H03K/19/0175 |
| JP | H11-103244 | | 4/1999 | |
| JP | 2000-295088 | | 10/2000 | |

* cited by examiner

Primary Examiner—Michael Tokar
Assistant Examiner—Vibol Tan
(74) Attorney, Agent, or Firm—Sughrue Mion, PLLC

(57) ABSTRACT

A signal transmission apparatus is disclosed for setting delay amounts based on an operational speed. At least some of a plurality of rectangular wave signals transmitted in parallel are individually delayed by a plurality of signal delaying means for different time periods from one another in order to prevent the occurrence of noise. At this point, the delay time in the plurality of signal delaying means are set by time varying means based on the operational speed of a digital circuit which outputs digital data as the rectangular wave signals.

9 Claims, 4 Drawing Sheets time for determining output data is short time for determining output data is long time for determining output data is intermediate

SIGNAL TRANSMISSION APPARATUS FOR SETTING DELAY AMOUNT BASED ON OPERATIONAL SPEED

BACKGROUND OF THE INVENTION

1. Field of the Invention

The present invention relates to signal transmission apparatus for transmitting a plurality of rectangular wave signals whose rising or falling edges may occur substantially simultaneously, and to a data processing apparatus including such a signal transmission apparatus.

2. Description of the Related Art

Currently, data processing apparatuses for performing various data processing are utilized in many fields. Such data processing apparatuses are configured in varying forms depending on required performance or use environments. For example, when a data processing apparatus comprising ICs (Integrated Circuit) is used in a particular application, the data processing apparatus may incorporate a unique circuit apparatus as an ASIC (Application Specific IC).

Such ICs are typically configured by digital circuits, but may includes analog circuits. In this case, since the digital circuits perform digital processing and the analog circuits perform analog processing, it is possible to utilize the advantages of both digital operation and analog operation.

However, when a digital circuit produces rectangular wave signals as digital data, rising or falling edges may simultaneously occur in a plurality of rectangular wave signals. Such simultaneous occurrence of rising or falling edges in a plurality of rectangular wave signals produces much noise which is likely to affect analog circuits.

An apparatus which intends to solve such a problem is disclosed, for example in Japanese Patent Laid-open Publication No. 9-23148. FIG. 1 shows the configuration of a conventional signal transmission apparatus disclosed in the gazette.

This conventional signal transmission apparatus 100 comprises, for example, five signal transmission paths 101 to 105 as a plurality of signal transmitting means. Each of signal transmission paths 101 to 105 respectively transmit a rectangular wave signal. The rising and falling edges of these signals may occur substantially simultaneously.

Signal transmission path 101 consists of one simple signal wire, while signal transmission paths 102 to 105 are each connected to delay circuits 117. Signals which are delayed by delay circuits 117 for a predetermined time period are supplied to one terminal of respective selectors 107 to 110 and to four delay circuits 112 to 115 with differing delay times. Signals which are delayed by delay circuits 112 to 115 are supplied to the other terminal of respective selectors 107 to 110.

Each of selectors 107 to 110 selects and outputs either the signal from delay circuit 117 or the signal from the associated delay circuit. Signal transmission paths 101 to 105 are also connected near their input terminals to switching control circuit 116 which in turn is connected to control terminals of selectors 107 to 110.

Switching control circuit 116 counts rectangular wave signals whose rising edges and falling edges occur simultaneously of five rectangular wave signals transmitted through signal transmission paths 101 to 105, and performs control to cause selectors 107 to 110 to select the signal from the associated delay circuit if the count exceeds a predetermined threshold value.

Delay circuits 117 having the same delay time inserted in respective signal transmission paths 102 to 105 serve the delay rectangular wave signal for a time period required for the operations of switching control circuit 116 and selectors 107 to 110.

In the aforementioned conventional signal transmission apparatus 100, signal transmission paths 101 to 105 each transmit a rectangular wave signal. In the transmission, signal transmission path 101 transmits a rectangular wave signal without delay, while signal transmission paths 102 to 105 transmit rectangular wave signals after the signals are delayed as required.

Next, the operation of conventional signal transmission apparatus 100 is described.

When a rectangular wave signal is transmitted through respective signal transmission paths 101 to 105, switching control circuit 116 counts the number of the simultaneous occurrence of rising and falling edges in the signals. If the counted number is below the predetermined threshold value, then switching control circuit 116 causes selectors 107 to 110 to select the normal paths into which delay circuits 112 to 115 are not inserted. Thus, the rectangular wave signals are transmitted over signal transmission paths 102 to 105 without being delayed by delay circuits 112 to 115.

However, if the number of the simultaneous occurrence of rising edges and falling edges in the five rectangular wave signals exceeds the predetermined threshold value, then switching control circuit 116 causes selectors 107 to 110 to select the paths into which delay circuits 112 to 115 are inserted.

Each of rectangular wave signals in signal transmission paths 102 to 105 is then delayed by delay circuits 112 to 115 for differing time periods. This causes rising edges and falling edges in the plurality of rectangular wave signals to occur in different timings, thereby preventing the occurrence of noise due to the simultaneous rising or falling of many signals.

Some digital circuits which output rectangular wave signals to the aforementioned signal transmission apparatus 100 and some digital circuits which receive rectangular wave signals from signal transmission apparatus 100 allow switch the setting of operational speeds.

However, in the aforementioned conventional signal transmission apparatus 100, since delay circuits 117 are interposed in signal transmission paths 102 to 105, each of rectangular wave signals is always delayed by delay circuit 117 for a predetermined time period regardless of the operations of switching control circuit 116 and each of selectors 107 to 110. Furthermore, a delay time in delay circuit 117 is fixed, so that conventional signal transmission apparatus 100 cannot appropriately correspond to switching of the setting of the operational speed of a digital circuit.

For example, if the delay time in signal transmission apparatus 100 is designed to correspond to the low-speed operation of a digital circuit, the transmission of digital data will be uselessly delayed when the digital circuit is operated at high speed. On the other hand, if the delay time in signal transmission apparatus 100 is adapted to the high-speed operation of the digital circuit, the operation of delaying digital data will be late when the digital circuit is operated at low speed.

SUMMARY OF THE INVENTION

In view of the aforementioned problems, it is an object of the present invention to provide signal transmission method and apparatus which, when at least some of a plurality of rectangular wave signals are delayed for differing time periods to prevent the occurrence of noise, allows the setting of the delay time appropriately for the operational speed of a digital circuit.

The signal transmission apparatus according to the present invention comprises a plurality of signal transmitting means, a plurality of signal delaying means, and time varying means. With such a signal transmission apparatus, when the plurality of signal transmitting means each transmits a rectangular wave signal, rising or falling edges of these rectangular signals may occur substantially simultaneously, at least some of the plurality of rectangular wave signals transmitted by the plurality of signal transmitting means are delayed by the signal delaying means for differing time periods. Thus, the occurrence of noise due to the simultaneous rising or falling of many rectangular wave signals is prevented. In addition, the delay time in each of the plurality of signal delaying means is set by the time varying means based on the operational speed of a digital circuit which outputs digital data as rectangular wave signals.

In another aspect of the present invention, each of the plurality of signal delaying means comprises a predetermined number of delay circuits, and the time varying means may comprise a plurality of selectors each selecting one delay circuit among the predetermined number of delay circuits. This arrangement allows the variable setting the delay time in each of the plurality of signal delaying means.

In another aspect of the of the present invention, each of the plurality of signal delaying means also includes one direct path for transmitting the rectangular wave signal without delay, and the selector of the time varying means may select the direct path in addition to the delay circuits in each of the plurality of signal delaying means. In this case, since the selector of the time varying means selects one of the plurality of delay circuits or the one direct path in each of the plurality of signal delaying means, the rectangular wave signal is transmitted without delay when the direct path is selected.

A data processing apparatus of the present invention comprises a digital circuit, an analog circuit, and the signal transmission apparatus of the present invention. The digital circuit performs data processing with digital data, and the analog circuit performs data processing with analog data. Since the digital circuit produces a plurality of rectangular wave signals as digital data and outputs the signals to the signal transmission apparatus of the present invention, at least some of the plurality of rectangular wave signals transmitted by the signal transmission apparatus are individually delayed for differing time periods. At this point, since the digital circuit controls time settings the time varying means in the signal transmission apparatus, the delay time in the signal transmission with the signal transmission apparatus are also controlled by the digital circuit which produces the rectangular wave signals.

In another aspect of the present invention, the digital circuit may comprise speed varying means for variably setting the operational speed thereof and setting control means for controlling time settings with the time varying means based on the operational speed set by the speed varying means.

In this case, the speed varying means sets the operational speed of the digital circuit, and the setting control means controls the time settings with the time varying means based on the operational speed set by the speed varying means.

It should be noted that various means referred to in the present invention may be realized in various forms such as dedicated hardware, computers provided with proper functions through programs, functions realized within computers with proper programs, a combination thereof, and the like.

The above and other objects, features and advantages of the present invention will become apparent from the following description with reference to the accompanying drawings which illustrate examples of the present invention.

DETAILED DESCRIPTION OF THE PREFERRED EMBODIMENT

Figure 1:
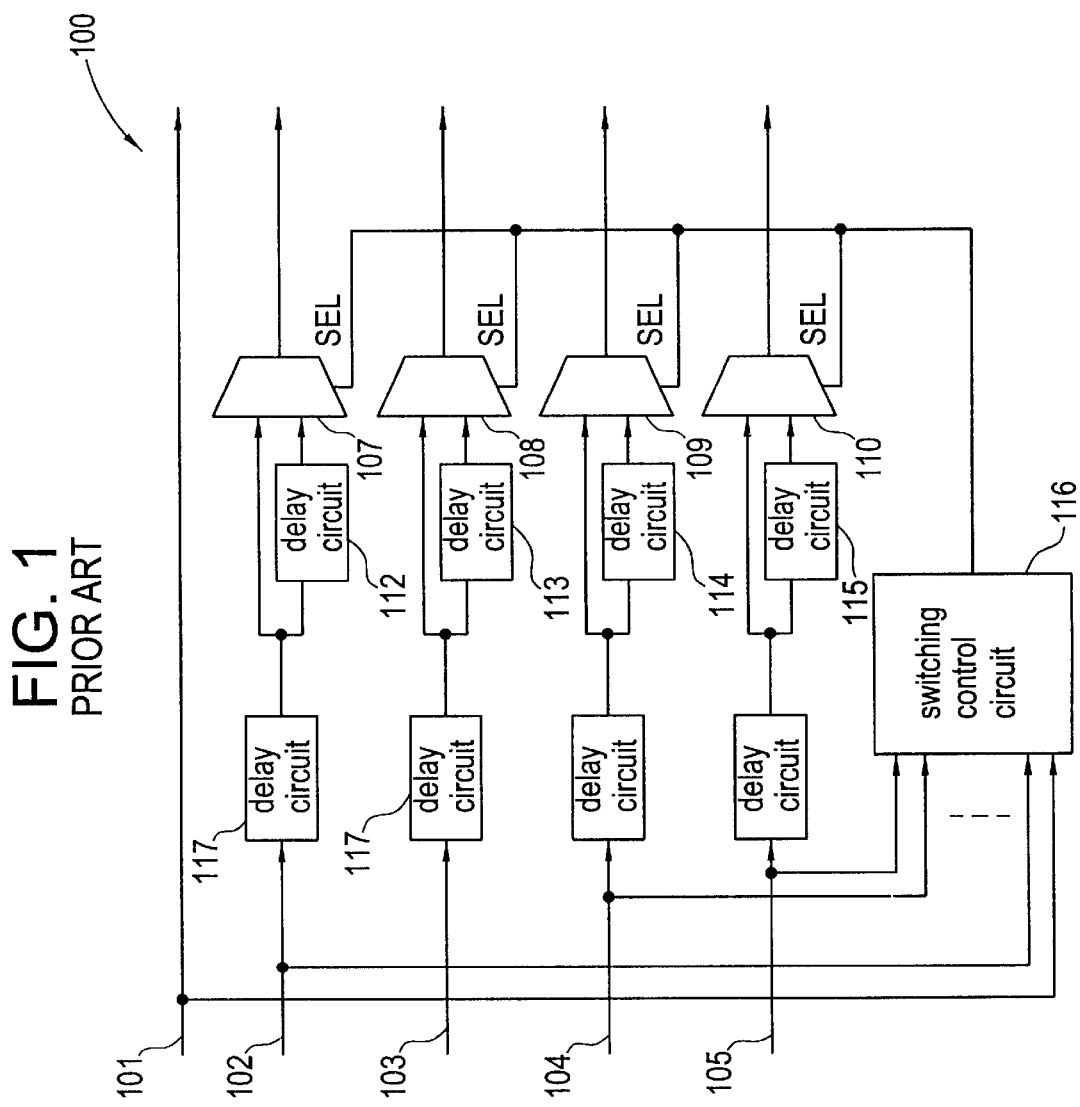
FIG. 1 is a circuit diagram showing an example of a configuration of a conventional signal transmission apparatus.
Figure 2:
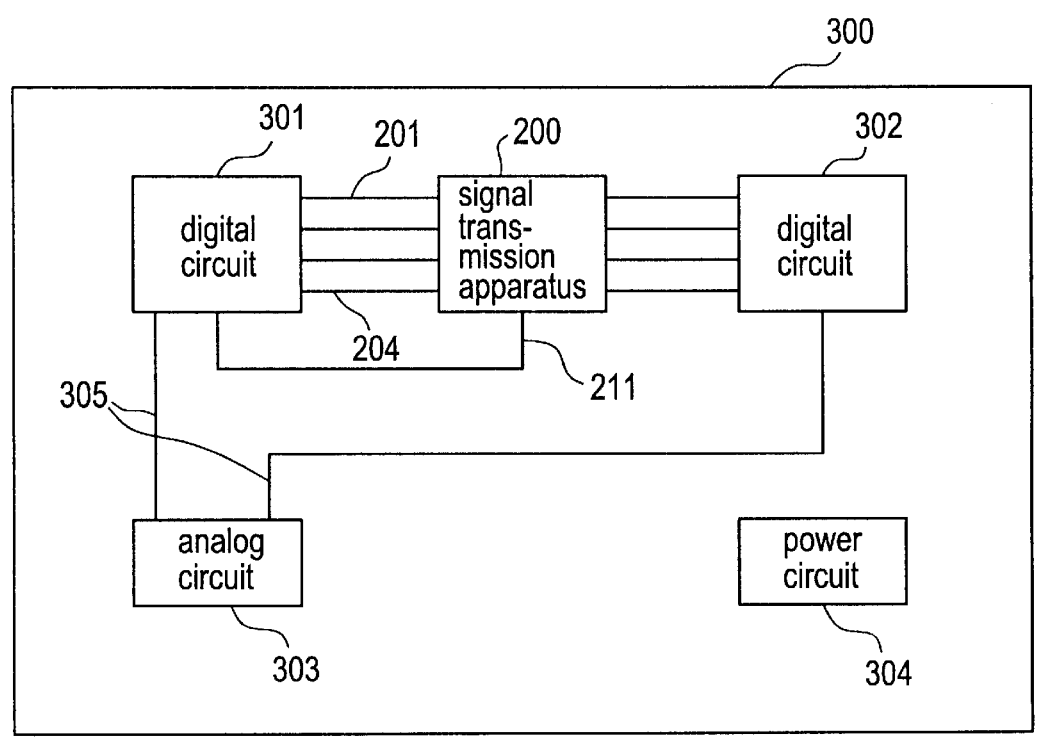
FIG. 2 is a block diagram showing a configuration of a data processing apparatus.

Referring now to FIG. 2, there is shown a signal transmission apparatus 200 of the present embodiment configured as part of data processing apparatus 300 of the embodiment. Data processing apparatus 300 comprises, for example, a single LSI chip configured as an ASIC, and includes signal transmission apparatus 200, a pair of digital circuits 301 and 302, one analog circuit 303, power circuit 304, and the like.

Power circuit 304 is connected to digital circuits 301, 302 and analog circuit 303 through power line (not shown) for supplying these circuits 301 to 303 with driving power.

A pair of digital circuits 301 and 302 are connected each other via signal transmission apparatus 200 through four signal transmission paths 201 to 204 serving as signal transmitting means. Paired digital circuits 301 and 302 are connected to analog circuit 303 through signal paths 305.

Digital circuits 301 and 302 perform data processing with digital data, while analog circuit 303 performs data processing with analog data. Such digital circuits 301, 302 and analog circuit 303 communicate various data with each other as required.

Digital circuit 301 produces digital data comprising rectangular wave signals with digital processing and outputs the data to signal transmission paths 201 to 204, for example. Signal transmission apparatus 200 transmits the input rectangular wave signals to digital circuit 302 through signal transmission paths 201 to 204.

Figure 3:
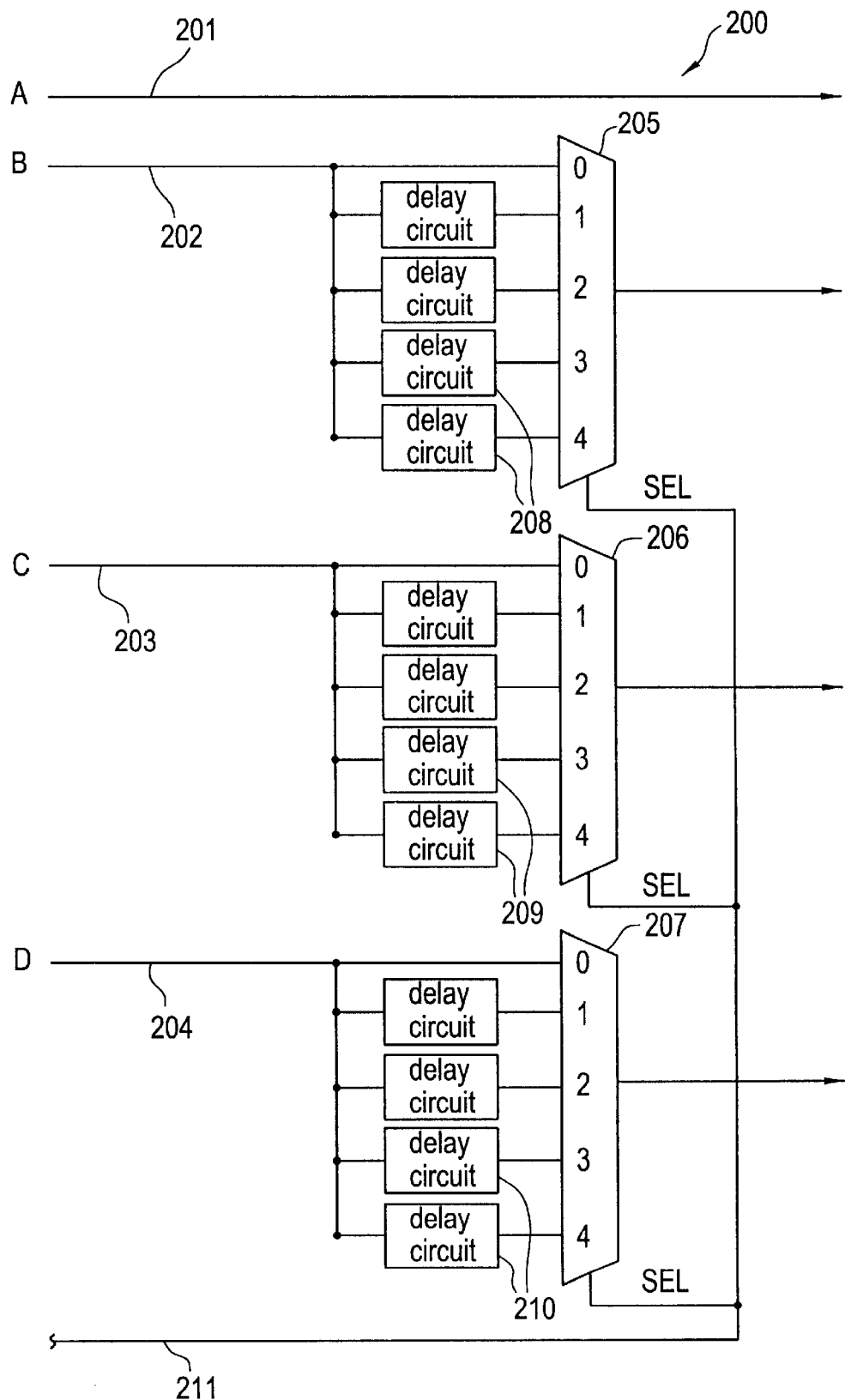
FIG. 3 is a block diagram showing a configuration of a signal transmission apparatus of an embodiment of the present invention.

In signal transmission apparatus 200 of the present embodiment, as shown in FIG. 3, signal transmission path 201 is made up of a simple direct path, while additional four signal transmission paths are connected to each of signal transmission paths 202 to 204 is split into five and one of the five paths is selected by each of selectors 205 to 207 serving as time varying means.

For example, five signal transmission paths 202 connected to selector 205 includes the first one comprising a simple direct path and the second to fifth ones into which delay circuits 208 serving as signal delaying means are individually inserted. The same structure applies to signal transmission paths 203 and 204 in which delay circuits 209 and 210 are inserted into four of five additional paths, respectively.

Each of selectors 205 to 207 in signal transmission paths 202 to 204 selects one of the direct paths and the four additional paths from four delay circuits 208, 209 and 210 connected thereto. The delay time of delay circuits 208, 209 and 210 are different among three paths selected simultaneously by selectors 205 to 207 in signal transmission paths 202 to 204, and different among four paths connected to respective selectors 205 to 207.

Such delay time are set, for example, to 1 (msec) for first delay circuit 208 in signal transmission path 202, 2 (msec) for first delay circuit 209 in signal transmission path 203, 3 (msec) for first delay circuit 210 in signal transmission path 204, 2 (msec) for second delay circuit 208 in signal transmission path 202, 4 (msec) for second delay circuit 209 in signal transmission path 203, and 6 (msec) for second delay circuit 210 in signal transmission path 204, and the like.

In data processing apparatus 300 of the embodiment, digital circuits 301 and 302 include a speed varying function serving as speed varying means for variably setting the operational speed. In addition, digital circuit 301 also includes a setting control function serving as setting control means for switching and setting paths selected by selectors 205 to 207 through control line 211 based on the set speed.

In the aforementioned configuration, in data processing apparatus 300 of the embodiment, power circuit 304 supplies driving power with circuits 301 to 303, and the digital processing with digital circuits 301, 302 and the analog processing with analog circuit 303 are performed.

Analog circuit 303, which is susceptible to noise in terms of properties, is connected to digital circuits 301 and 302 through signal paths 305 and power circuit 304, may cause a malfunction if noise occurs due to the operations of digital circuits 301 and 302.

Figure 4A:
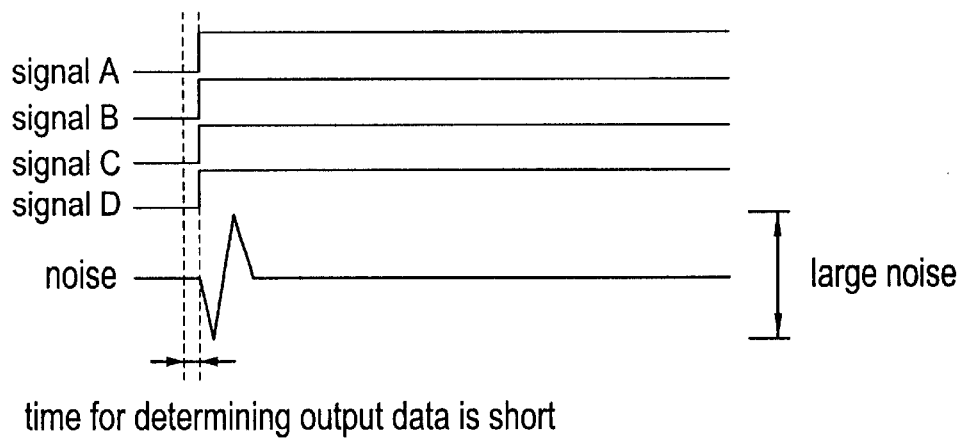
FIG. 4a, FIG. 4b, and FIG. 4c are timing charts showing relationships between rectangular wave signals and noise.

The variable setting of the operational speed allows digital circuits 301 and 302 to operate at an optimal speed as appropriate. Digital circuit 301 operates at a various speed and transmit a plurality of rectangular wave signals in parallel with each other as digital data to digital circuit 302 whose rising edges may simultaneously occur as shown in FIG. 4a.

Figure 4B:
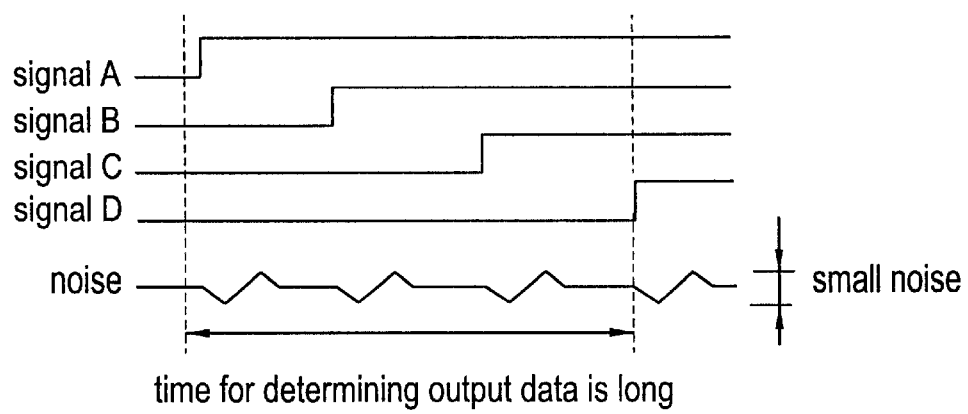
Figure 4C:
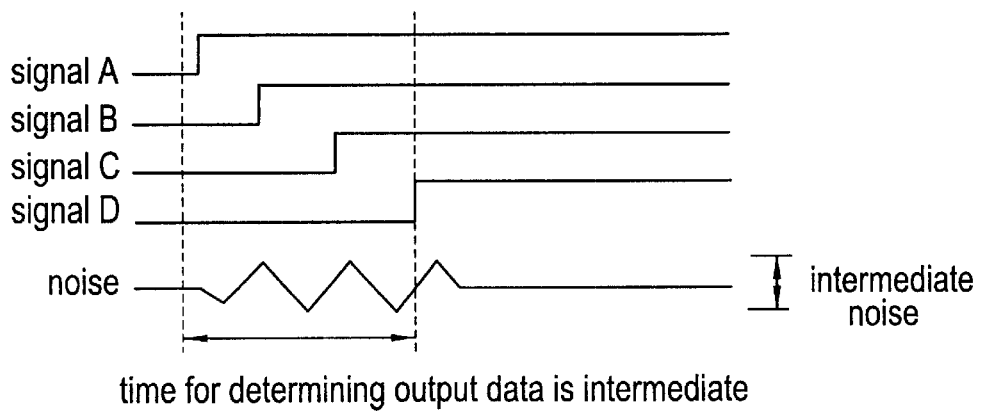

Such simultaneous occurrence of rising edges of the plurality of rectangular wave signals may produce much noise which lead to the malfunction of analog circuit 303. In data processing apparatus 300 of the embodiment, however, signal transmission apparatus 200 can differentiate the rising edges of the four rectangular signals as shown in FIG. 4b and FIG. 4c.

More specifically, when the operational speed of digital circuit 301 is set, digital circuit 301 controls to switch paths selected by selectors 205 to 207 in signal transmission apparatus 200 based on the set speed of digital circuit 301. For example, if the operational speed of digital circuit 301 is set to "maximum," selectors 205 to 207 select the direct paths in which delay circuits 208 to 210 are not present, and hence the rectangular wave signals of digital data are transmitted without delay.

In contrast, if the operational speed of digital circuit 301 is set to "minimum," selectors 205 to 207 select delay circuits 208 to 210 having "maximum" delay times, respectively. In this case, as shown in FIG. 4b, three of the four rectangular wave signals are significantly delayed for differing time periods. Consequently, the transmission of the digital data is greatly delayed, but the occurrence of noise is minimized.

If the operational speed of digital circuit 301 is set to "intermediate," selectors 205 to 207 select delay circuits 208 to 210 having "intermediate" delay times, respectively. In this case, as shown in FIG. 4c, three of the four rectangular wave signals are moderately delayed for differing time periods. Consequently, the transmission of the digital data is slightly delayed with slight occurrence of the noise.

Signal transmission apparatus 200 of the embodiment delays at least some of a plurality of rectangular wave signals whose rising edges substantially simultaneously occur as described above similar to conventional signal transmission apparatus 100, for differing time periods, respectively, when the signals are transmitted through a plurality of signal transmission paths 201 to 204. This makes it possible to prevent the occurrence of noise due to the simultaneous rising edges of many rectangular wave signals to thereby prevent the malfunction of analog circuit 303.

In addition, in data processing apparatus 300 of the present embodiment, the operational speeds of digital circuits 301 and 302 are variably set, which transmit digital data there between through signal transmission apparatus 200 in parallel each other as a plurality of rectangular wave signals.

Digital circuit 301 switchably sets the delay time in signal transmission apparatus 200 in accordance with the operational speed of digital circuit 301. For example, when the high-speed operation of digital circuits 301 and 302 is required rather than the stability of the operation of analog circuit 303, the transmission of digital data with signal transmission apparatus 200 can be performed at high speed. On the other hand, when the stability of analog circuit 303 is required rather than the high speed of digital circuits 301 and 302, the data transmission with signal transmission apparatus 200 can be performed at low speed to prevent noise.

In particular, in data processing apparatus 300 of the embodiment, digital circuit 301, which outputs digital data to signal transmission apparatus 200 as a plurality of rectangular wave signals, switchably sets the delay time in signal transmission apparatus 200 based on the operational speed of digital circuit 301. Thus, a plurality of rectangular wave signals need not be always delayed for switchably setting in signal transmission apparatus 200, and as required, all of the plurality of rectangular wave signals can be transmitted without any delay.

It should be noted that the present invention is not limited to the aforementioned embodiment, and various modifications are possible within the scope without departing from the gist. For example, while the aforementioned embodiment shows a specific example of the numbers of signal transmission paths and delay circuits, it goes without saying that the numbers can be arbitrarily varied.

While a preferred embodiment of the present invention has been described using specific terms, such description is for illustrative purposes only, and it is to be understood that changes and variations may be made without departing from the spirit or scope of the following claims.

What is claimed is:

1. A signal transmission apparatus comprising:
   a plurality of signal transmitting means each transmitting a rectangular wave signal over a signal transmission path, the rising or falling edges of said signals occur substantially simultaneously;
   a plurality of signal delaying means each coupled to a signal transmission path and each delaying one of said plurality of rectangular wave signals transmitted by said plurality of signal transmitting means for different time periods from one another; and time varying means coupled to said plurality of signal delaying means and to the signal transmission paths to transmit the rectangular wave signals from said plurality of signal transmitting means with a delay time based on operational speeds of digital circuits which output said rectangular wave signals.

2. The signal transmission apparatus comprising:

a plurality of signal transmitting means each transmitting a rectangular wave signal, the rising or falling edges of said signals occur substantially simultaneously;

a plurality of signal delaying means each delaying each of at least some of said plurality of rectangular wave signals transmitted by said plurality of signal transmitting means for different time periods from one another; and time varying means for setting the delay time at said plurality of signal delaying means based on an operational speed of a digital circuit which outputs digital data as said rectangular wave signals;

wherein each of said plurality of signal delaying means includes a predetermined number of delay circuits with different delay time from one another, and said time varying means comprises a plurality of selectors each selecting one of said predetermined number of delay circuits in each of said plurality of signal delaying means.

3. The signal transmission apparatus according to claim 2, wherein each of said plurality of signal delaying means further includes one direct path for transmitting said rectangular wave signal without delay, and said selector in said time varying means selects said direct path in addition to said delay circuits in each of said plurality of signal delaying means.

4. A data processing apparatus comprising:

a digital circuit for performing data processing with digital data, an analog circuit for performing data processing with analog data, and a signal transmission apparatus comprising:

a plurality of signal transmitting means each transmitting a rectangular wave signal, the rising or falling edges of said signals occur substantially simultaneously;

a plurality of signal delaying means each delaying each of at least some of said plurality of rectangular wave signals transmitted by said plurality of signal transmitting means for different time periods from one another; and time varying means for setting the delay time at said plurality of signal delaying means based on an operational speed or a digital circuit which outputs digital data as said rectangular wave signals;

wherein said digital circuit producing said plurality of rectangular wave signals as digital data, outputting said signals, and controlling time settings with said time varying means.

5. A data processing apparatus comprising:

a digital circuit for performing data processing with digital data, an analog circuit for performing data processing with analog data, and the signal transmission apparatus according to claim 2, wherein said digital circuit produces said plurality of rectangular wave signals as digital data, outputting said signals, and controlling time settings with said time varying means.

6. A data processing apparatus comprising:

a digital circuit for performing data processing with digital data and, an analog circuit for performing data processing with analog data, and the signal transmission apparatus according to claim 3, said digital circuit producing said plurality of rectangular wave signals as digital data, outputting said signals, and controlling time settings with said time varying means.

7. The data processing apparatus according to claim 4, wherein said digital circuit includes:

speed varying means for variably setting an operational speed of said digital circuit; and setting control means for controlling time settings with said time varying means based on the operational speed set by said speed varying means.

8. The data processing apparatus according to claim 5, wherein said digital circuit includes:

speed varying means for variably setting an operational speed of said digital circuit; and setting control means for controlling time settings with said time varying means based on the operational speed set by said speed varying means.

9. The data processing apparatus according to claim 6, wherein said digital circuit includes:

speed varying means for variably setting an operational speed of said digital circuit; and setting control means for controlling time settings with said time varying means based on the operational speed set by said speed varying means.

* * * * *